April 19, 1949.    R. M. CUTSINGER ET AL    2,467,816
COUPLING FOR TRACTOR OR TRAILER VEHICLES
Filed Nov. 14, 1947
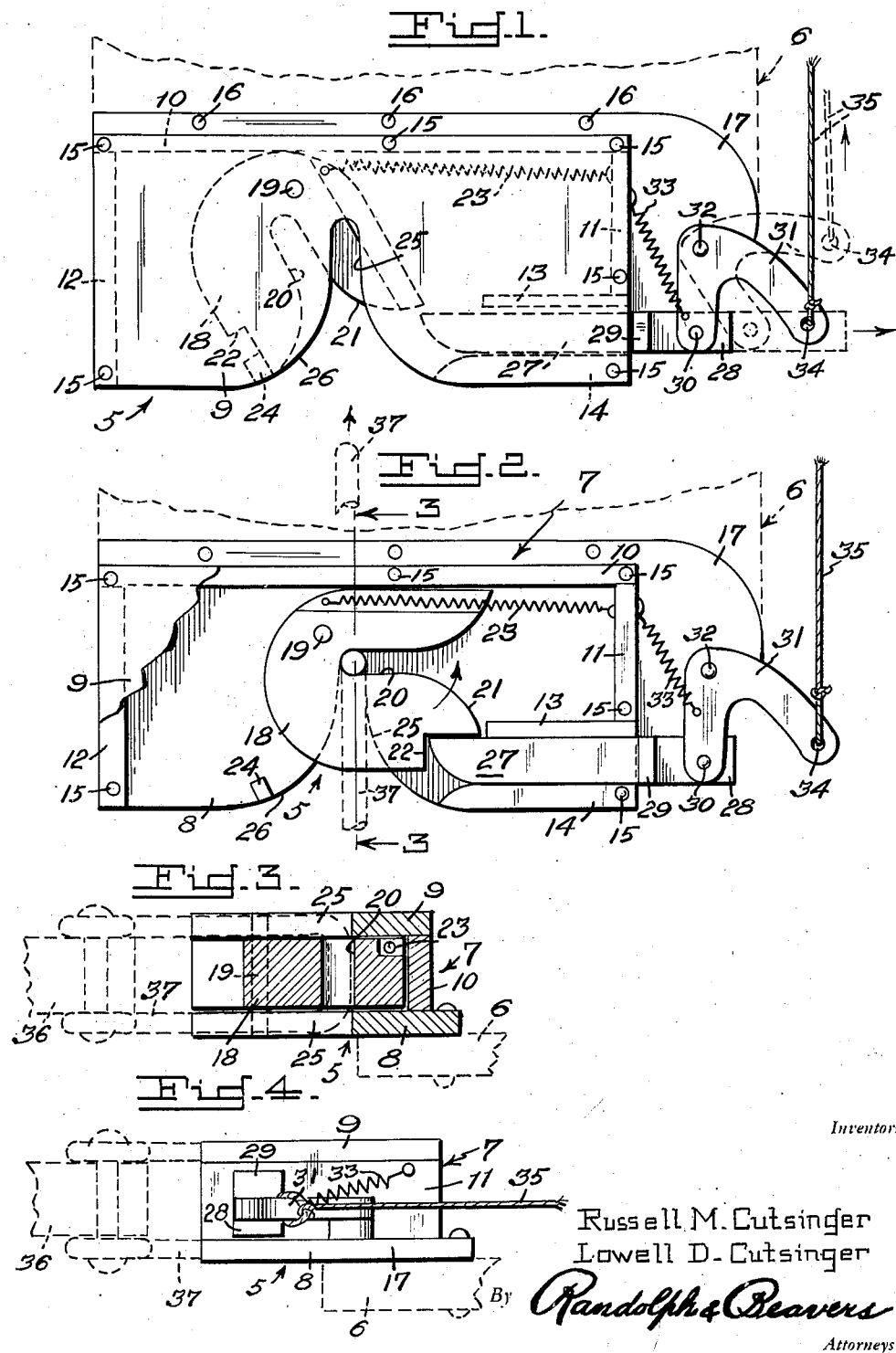
Inventors,
Russell M. Cutsinger
Lowell D. Cutsinger
By Randolph & Beavers
Attorneys Patented Apr. 19, 1949

2,467,816

UNITED STATES PATENT OFFICE 2,467,816

COUPLING FOR TRACTOR OR TRAILER VEHICLES

Russell M. Cutsinger and Lowell D. Cutsinger, Newman, Ill.

Application November 14, 1947, Serial No. 786,090

1 Claim. (Cl. 280—33.15)

This invention relates to a novel construction of coupling capable of use either on a tractor or a trailer vehicle and which is especially applicable to mounting on the rear end of a draft vehicle or tractor to provide a ready means whereby a trailer vehicle may be coupled thereto automatically and readily uncoupled therefrom by a simple manipulation of the operator of the draft vehicle or tractor from the operator's seat, and which will effectively function to release the trailer vehicle coupled to the draft vehicle.

Still a further object of the invention is to provide a coupler which will normally be disposed in an open position preparatory to receiving a link or pin of a vehicle to be coupled to the vehicle on which said coupler is mounted and whereby the coupler will be automatically moved to and latched in a closed position by movement of coupler link or pin into engagement with the coupler.

Various other objects and advantages of the invention will hereinafter become more fully apparent from the following description of the drawing, illustrating a preferred embodiment thereof, and wherein:

Figure 1 is a top plan view showing the coupler in an applied position and with the parts thereof in uncoupled position;

Figure 2 is a top plan view, partly broken away and showing the parts of the coupler in their closed or coupled position;

Figure 3 is a vertical sectional view taken substantially along a plane as indicated by the line 3—3 of Figure 2, and Figure 4 is a side elevational view of the coupler looking from right to left of Figures 1 and 2.

Referring more specifically to the drawing, the improved coupler comprising the invention is designated generally 5 and for the purpose of illustrating a preferred application and use thereof is shown secured to and projecting from the rear end of a portion of a draft vehicle indicated at 6 and which may preferably assume the form of a tractor, not shown.

The coupler 5 includes a housing, designated generally 7 composed of a bottom or base plate 8, a top plate 9 and spacing members 10, 11, 12, 13 and 14 which are interposed between the plates 8 and 9 for spacing the plate 9 above the plate 8 and which are connected to said plate by suitable fastenings 15 by means of which the top and bottom plates 9 and 8, respectively, are connected. As seen in each of the views, the inner or forward edge of the bottom or base plate 8 extends beyond the top plate 9 for receiving fastenings 16 by means of which the coupler frame 7 is secured to the draft vehicle portion 6 and said base plate 8 is also provided with an extension 17 at one end thereof and for a purpose which will hereinafter be described.

A coupling element 18 is loosely disposed within the frame 7 and is swingably mounted therein on a pin 19 which extends rotatably therethrough and is anchored at its ends in the bottom and top plates 8 and 9. The coupling element 18 is provided with an elongated recess 20 which opens outwardly of the end thereof which is remote to the pivot 19 and which is provided with a flared mouth 21. An outer edge of the element 18 which is remote to the pivot 19 and disposed adjacent one side of the flared mouth 21 is recessed to provide a notch 22 for a purpose which will hereinafter become apparent. A contractile coiled spring 23 is disposed within the housing 7 and has one end anchored to the spacing element 11 and its opposite end connected to the coupler element 18 adjacent the other side edge thereof and near the pivot 19; said spring 23 functioning to cause the coupler element 18 to normally swing clockwise to its open, dotted line position of Figure 1. The clockwise movement of the coupler element 18 under the biasing action of the spring 23 is limited by a stop 24 which is disposed within the housing 7 and which engages the notch 22 so that when said coupler element 18 is in its open position a portion of the flared mouth 21 thereof will be in registry with a recess 25 of the housing 7 and which extends transversely thereof or in a direction longitudinally of the vehicle to which the coupler 5 is secured and which is provided with an open, flared end 26 which opens outwardly of the coupler frame 7 or rearwardly of the draft vehicle on which the coupler 5 is mounted. It will be readily obvious that the recess 25, 26 is formed by corresponding recess portions of the bottom and top plates 8 and 9, as best illustrated in Figure 3.

A latch bar 27 has one end thereof slidably disposed in the frame 7 between the spacing elements 13 and 14 which provide guides therefor and said latch bar 27 is movable in a direction transversely toward and away from the housing recess 25 and has an outer end projecting from one end of the housing 7 and over the base plate extension 17. Said end 28 of the latch bar or bolt 27 is provided with a stop 29 for limiting the inward movement of said latch bolt and is pivotally connected at 30 to the terminal portion of one leg of a modified bell crank 31 which is pivotally mounted at its apex by a pin 32 on the upper side of the base plate portion 17. A contractile coiled spring 33 has one end anchored to the face of strip 11 and its opposite end connected to the intermediate portion of the aforementioned leg of the bell crank 31 for urging said bell crank to rock clockwise and for thereby biasing the latch bolt 27 inwardly of the housing 7 and into its position as illustrated in Figure 2. The other leg of the bell crank 31 extends outwardly from the outer edge of the base extension 17 and is provided with an opening 34 adjacent its terminal by means of which one end of a pull member 35, such as a cord or cable may be secured thereto. The pull member or cord 35 extends forwardly with respect to the vehicle, partially indicated at 6 and is adapted to have a portion thereof, not shown, disposed adjacent the operator's seat of said vehicle and for a purpose which will hereinafter be described.

As seen in Figures 3 and 4, a portion of a draw bar or tongue 36 having a coupling link 37 at the free end thereof is shown in dotted lines. The draw bar or tongue 36 may be connected to any suitable trailer vehicle or farm implement, not shown.

Accordingly, it will be readily apparent that with the coupler 5 disposed with its parts in released position, as illustrated in Figure 1, the tractor or draft vehicle upon which the coupler is mounted could be backed toward the coupler link 37 so that said link would engage the recessed mouth 26 and be guided thereby into the recess 25 and in so moving would strike the flared mouth portion 21 of the recess 20 which extends across the recess 25 to thereby swing the coupler element 18 counterclockwise against the action of the spring 23 from its position of Figure 1 to its position of Figure 2. As the coupler element 18 is thus moved, the other side of the flared mouth 21 will engage the rounded inner end of the latch bolt 27 and the two rounded surfaces thus contacting will produce a camming action for forcing the latch bolt 27 outwardly of the housing 7 or from left to right of Figures 1 and 2 to permit said portion of the coupler element 18 to pass the inner end of the latch bolt 27 after which the spring 33 will move the latch bolt inwardly of the housing 27 and into engagement with the notch 22 for latching the coupler element 18 in its closed position of Figure 2 and for retaining the coupler link 37 engaged in the housing recess 25. When it is desired to uncouple the link 37 from the coupler 5 the operator of the vehicle on which the coupler is mounted by exerting a forward pull on the flexible member 35, from a position remote to the bell crank 31, for example from the operator's seat of the vehicle, can rock said bell crank counterclockwise as seen in Figure 1 for moving the latch bolt 27 to the right or to its dotted line position, out of engagement with the notch 22 and so that the spring 23 will return the coupler element 18 to its position of Figure 1 for releasing the link 37 from the recess 25 and for thereby returning the coupler element 18 to a position whereby a link or pin can be latched in the coupler 5 when it is again moved inwardly of the recess 25.

Various modifications and changes are contemplated and may obviously be resorted to, without departing from the spirit or scope of the invention as hereinafter defined by the appended claim.

We claim as our invention:

A coupler of the character described comprising a coupler frame adapted to be secured to an end of a vehicle and protruding therefrom and provided with a rearwardly extending, rearwardly opening recess, a coupler element pivotally mounted for swinging movement in said frame and having a recess opening outwardly of one end thereof, spring means for normally biasing said coupling element to an open position and with a portion of the recess thereof in communication with the frame recess and with a portion of the coupler element closing the inner end of the recess of the frame whereby said coupler element will be rocked against the action of said spring means by the entrance of a coupler link or the like into the frame recess for causing another portion of the coupler element to close the frame recess outwardly of the coupler link, a spring biased latch bolt having a rounded end disposed in the path of movement of said coupler element to its last mentioned, closed position for permitting a portion of the coupler element to move past the latch bolt for releasing said latch bolt for movement into a position for retaining said coupler element in its last mentioned, closed position, a bell crank pivotally mounted on a portion of the frame and having one leg pivotally connected to a portion of said latch bolt, and a manually actuated element connected to the other end of said bell crank and adapted to be manually actuated from a remote position to the coupler for moving said latch bolt to a retracted position, out of engagement with the coupler element.

RUSSELL M. CUTSINGER.
LOWELL D. CUTSINGER.

REFERENCES CITED

The following references are of record in the file of this patent:

UNITED STATES PATENTS

| Number | Name | Date |
| --- | --- | --- |
| 774,903 | Ammenn | Nov. 15, 1904 |
| 806,216 | Van Wye | Dec. 5, 1905 |
| 856,795 | Morris | June 11, 1907 |
| 1,060,441 | Engel | Apr. 29, 1913 |